US012738492B2

(12) United States Patent
Mori et al.

(10) Patent No.: US 12,738,492 B2
(45) Date of Patent: Sep. 15, 2026

(54) HETEROELEMENT-CONTAINING VANADIUM SULFIDE

(71) Applicant: NATIONAL INSTITUTE OF ADVANCED INDUSTRIAL SCIENCE AND TECHNOLOGY, Tokyo (JP)

(72) Inventors: Masahiro Mori, Ikeda (JP); Shingo Tanaka, Ikeda (JP); Tomonari Takeuchi, Ikeda (JP); Hikari Sakaebe, Ikeda (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 598 days.

(21) Appl. No.: 18/035,971

(22) PCT Filed: Nov. 10, 2021

(86) PCT No.: PCT/JP2021/041425

§ 371 (c)(1),
(2) Date: May 9, 2023

(87) PCT Pub. No.: WO2022/102680

PCT Pub. Date: May 19, 2022

(65) Prior Publication Data

US 2023/0420672 A1 Dec. 28, 2023

(30) Foreign Application Priority Data

Nov. 10, 2020 (JP) ................................ 2020-187516

(51) Int. Cl.

| | |
|---|---|
| ***H01M 4/58*** | (2010.01) |
| ***C01G 31/00*** | (2006.01) |
| ***H01M 10/0525*** | (2010.01) |

(52) U.S. Cl.

CPC .......... *H01M 4/5815* (2013.01); *C01G 31/00* (2013.01); *H01M 10/0525* (2013.01);

(Continued)

(58) Field of Classification Search

CPC ........... H01M 4/5815; H01M 10/0525; H01M 4/136; H01M 10/42; C01G 31/00;

(Continued)

(56) References Cited

U.S. PATENT DOCUMENTS 4,009,052 A * 2/1977 Whittingham ........ H01M 4/581 429/304

FOREIGN PATENT DOCUMENTS

| | | |
|---|---|---|
| CN | 109939699 A | 6/2019 |
| JP | H1050347 A | 2/1998 |

(Continued)

OTHER PUBLICATIONS

Yun, Hoseop et al., "A New Quasi-One-Dimensional Ternary Chalcogenide: Synthesis, Crystal Structure, and Electronic Structure of Nb1-xV1-xS5(x=0.18)", Inorganic Chemistry, 2003, vol. 42/No. 7, pp. 2253-2260.

(Continued)

*Primary Examiner* — Mark Kopec
*Assistant Examiner* — Jaison P Thomas
(74) *Attorney, Agent, or Firm* — MH2 Technology Law Group, LLP

(57) ABSTRACT

A foreign element-containing vanadium sulfide contains, as constituent elements, vanadium, sulfur, and a foreign element, wherein the compositional ratio of the foreign element to the vanadium (M1/V) is in the range of 0.05 to 1.5 in terms of molar ratio; the compositional ratio of the sulfur to the vanadium (S/V) is in the range of 3.0 to 10.0 in terms of molar ratio; and the foreign element includes at least one member selected from the group consisting of Nb, Ti, Zr, (Continued)

Mo, Sc, and Y, or includes at least one member selected from the group consisting of Li, B, N, O, F, Mg, S, Cl, Ca, Br, Sr, Sc, I, Fe, Co, Ni, Zn, Y, Mo, Tc, and Cd. The foreign element-containing vanadium sulfide is an electrode active material for a lithium ion secondary battery that exhibits satisfactorily high initial capacity and that provides improved electrochemical performance or cycle performance.

11 Claims, 13 Drawing Sheets

(52) U.S. Cl.
CPC ...... *C01P 2002/54* (2013.01); *C01P 2002/77* (2013.01); *C01P 2006/40* (2013.01)

(58) Field of Classification Search
CPC . C01G 31/006; C01G 33/006; C01P 2002/54; C01P 2002/77; C01P 2006/40; C01P 2006/80; G16C 20/30; Y02E 60/10; Y02P 20/133
See application file for complete search history.

(56) References Cited

FOREIGN PATENT DOCUMENTS

| | | | |
|---|---|---|---|
| JP | 2021034290 | A | 3/2021 |
| WO | 2018181698 | A1 | 10/2018 |

OTHER PUBLICATIONS

Xu, et al., Lithium reaction mechanism and high rate capability of VS4-graphene nanocomposite as an anode material for lithium batteries, J. Mater. Chem. A, 2014, vol. 2:10847, 7 pages.

International Search Report dated Jan. 25, 2022 for corresponding International Application No. PCT/JP2021/041425, 5 pages (with English language translation).

Office Action dated Oct. 19, 2024 for corresponding Chinese Application No. 202180075663.8 with English translation, 25 pages.

Chuan-Zhu et al., "First-principles study of doped cathode materials VS4 in magnesium ion batteries", Journal of Atomic and Molecular Physics, 2021, vol. 38, No. 1, 6 pages with English abstract.

Xu et al., "Oxygen-Doped VS4 Microspheres with Abundant Sulfur Vacancies as a Superior Electrocatalyst for the Hydrogen Evolution Reaction", ACS Sustainable Chemistry & Engineering, 2020, vol. 8, No. 39, pp. 15055-15064.

Liu et al., "Vanadium sulfide based materials: synthesis, energy storage and conversion", Journal of Materials Chemistry A, 2020, vol. 8, No. 40, pp. 20781-20802.

Qu et al., "Effect of Doping on Hydrogen Evolution Reaction of Vanadium Disulfide Monolayer", Nanoscale Research Letters, 2015, vol. 10, No. 1, 7 pages.

Woo et al., "Theoretical dopant screening and processing optimization for vanadium disulfide as cathode material for Li-air batteries: A density functional theory study", Applied Surface Science, 2020, vol. 508, 145276, 6 pages.

Supplementary Extended European Search Report mailed Oct. 29, 2024 for EP Application No. 21891925.6.

* cited by examiner

DOS (H-O)

DOS (Na-Ar)

DOS (K-Kr)

DOS (Rb-Xe)

DOS (Sc-Zn)

DOS (Y-Cd)

HETEROELEMENT-CONTAINING VANADIUM SULFIDE

CROSS-REFERENCE TO RELATED APPLICATIONS

This application is a national stage application of PCT/JP2021/041425 filed 10 Nov. 2021 which claims priority to Japanese Patent Application No. 2020-187516 filed 10 Nov. 2020. The entire disclosures of each application are herein incorporated by reference.

TECHNICAL FIELD

The present invention relates to a foreign element-containing vanadium sulfide.

BACKGROUND ART

With recent high performance of portable electronic devices, hybrid vehicles, and other similar equipment, lithium ion secondary batteries for use in these applications are increasingly required to have higher capacity. However, the development of higher-capacity cathodes for lithium ion secondary batteries lags behind the development of higher-capacity anodes. Even lithium nickel oxide-based materials, which are thought to have a relatively high capacity, have a capacity of only about 190 to 220 mAh/g.

In contrast, sulfur has a theoretical capacity as high as about 1670 mAh/g and is a promising candidate for a cathode active material. However, sulfur has low electronic conductivity and also has the problem of dissolution as lithium polysulfide into an organic electrolyte solution during charging and discharging. Therefore, a technique for suppressing dissolution into organic electrolyte solutions is essentially required.

Metal sulfides, which are electronically conductive and also dissolve little in organic electrolyte solutions, are one of the promising cathode active materials as a high-capacity material that can replace current oxide-based active materials. However, since metal sulfides have a lower theoretical capacity than elemental sulfur, increasing sulfur content is necessary for metal sulfides to achieve a high capacity. This is because the sites of crystalline metal sulfides into which lithium can be inserted during discharging are defined according to crystal space groups, and this determines the maximum capacity.

As a vanadium sulfide among metal sulfides, for example, when vanadium disulfide ($V_2S_3$) being commercially available as a reagent is used as a cathode active material, the theoretical capacity is 811 mAh/g. When vanadium tetrasulfide ($VS_4$) having a high sulfur content is used, the theoretical capacity is 1196 mAh/g, which is even higher. However, in general, as the sulfur content increases, the electronic conductivity decreases. Therefore, a countermeasure against electronic conductivity reduction is necessary. In fact, Non-patent Literature (NPL) 1 reports that when a nanocomposite of vanadium sulfide with graphene oxide prepared by a hydrothermal synthesis method, $VS_{4-r}$GO, was produced, a capacity of more than 1000 mAh/g was exhibited and excellent electrochemical performances were achieved as an anode.

Although forming a composite with a carbon-based material is effective in improving electronic conductivity as described in non-patent literature (NPL) 1, the electrode density tends to decrease due to the effect of bulky carbon material, which is disadvantageous for achieving high energy density of the battery. Therefore, there is room for improvement, for example, in enhancing electronic conductivity by, for example, adding a foreign element to the active material itself. Improvement of electronic conductivity is also advantageous, for example, in battery performance.

On the other hand, metal polysulfides with high capacity have the problem of low reversibility due to a great structural change resulting from lithium insertion and extraction during charging and discharging. Since reversibility affects battery life, improvement in reversibility is required for practical use as a high-capacity cathode active material. For example, Patent Literature (PTL) 1 discloses a method of producing phosphorus-containing $VS_4$ by a mechanical milling method to stabilize the structure, thus improving reversibility and cycle performance.

CITATION LIST

Patent Literature

PTL 1: WO2018/181698

Non-Patent Literature

NPL 1: X. Xu et al., J. Mater. Chem. A, 2. (2014) 10847-10853.

SUMMARY OF INVENTION

Technical Problem

Thus, an object of the present invention is to provide an electrode active material for a lithium ion secondary battery that has sufficiently high initial capacity and improved electrochemical performance or cycle performance.

Solution to Problem

The present inventors repeatedly conducted extensive research to achieve the above object. As a result, it was expected from physical property simulation using first-principles calculation that addition of at least one element other than V and S (foreign element), in particular, at least one specific foreign element (Nb, Ti, Zr, Mo, Sc, or Y) stabilizes the structure and improves structural reversibility when lithium insertion and extraction are repeated. The present inventors found that when such a foreign element is incorporated into an electrode active material for a lithium ion secondary battery, a sufficiently high initial capacity and excellent electrochemical performance can be demonstrated. It was also expected that the addition of another specific foreign element (Li, B, N, O, F, Mg, S, Cl, Ca, Br, Sr, Sc, I, Fe, Co, Ni, Zn, Y, Mo, Tc, and Cd) can enhance electrochemical performance. The present inventors found that when such a foreign element is incorporated into an electrode active material for a lithium ion secondary battery, sufficiently high initial capacity and an enhanced utilization (%) can be achieved, and excellent electrochemical performance can be exhibited. The present invention has been accomplished through further research based on the above findings. Specifically, the present invention includes the following.

Item 1. A foreign element-containing vanadium sulfide comprising, as constituent elements, vanadium, sulfur, and an element other than vanadium and sulfur (foreign element), wherein the compositional ratio of the foreign element to the vanadium (M1/V) is in the range of 0.05 to 1.5 in terms of molar ratio;

the compositional ratio of the sulfur to the vanadium (S/V) is in the range of 3.0 to 10.0 in terms of molar ratio; and the foreign element includes at least one member selected from the group consisting of Nb, Ti, Zr, Mo, Sc, and Y.

Item 2. A foreign element-containing vanadium sulfide comprising, as constituent elements, vanadium, sulfur, and an element other than vanadium and sulfur (foreign element), wherein the compositional ratio of the foreign element to the vanadium (M2/V) is in the range of 0.05 to 1.5 in terms of molar ratio;

the compositional ratio of the sulfur to the vanadium (S/V) is in the range of 3.0 to 10.0 in terms of molar ratio; and the foreign element includes at least one member selected from the group consisting of Li, B, N, O, F, Mg, S, Cl, Ca, Br, Sr, Sc, I, Fe, Co, Ni, Zn, Y, Mo, Tc, and Cd.

Item 3. The foreign element-containing vanadium sulfide according to Item 1 or 2, which has a composition represented by formula (1):

$$V(M1_xM2_{(1-x)})_yS_z \quad (1)$$

wherein x represents 0 to 1, y represents 0.05 to 1.5, z represents 3.0 to 10.0, M1 represents at least one member selected from the group consisting of Nb, Ti, Zr, Mo, Sc, and Y, and M2 represents at least one member selected from the group consisting of Li, B, N, O, F, Mg, S, Cl, Ca, Br, Sr, Sc, I, Fe, Co, Ni, Zn, Y, Mo, Tc, and Cd.

Item 4. The foreign element-containing vanadium sulfide according to any one of Items 1 to 3, which has a $VS_4$ crystal structure.

Item 5. An active electrode material for a lithium ion secondary battery comprising the foreign element-containing vanadium sulfide of any one of Items 1 to 4.

Item 6. An electrode for a lithium ion secondary battery comprising the active electrode material for a lithium ion secondary battery of Item 5.

Item 7. A lithium ion secondary battery comprising the electrode for a lithium ion secondary battery of Item 6.

Item 8. A method for predicting performance of a lithium ion secondary battery comprising, as an electrode active material for the lithium ion secondary battery, a foreign element-containing vanadium sulfide that comprises vanadium, sulfur, and an element other than vanadium and sulfur (foreign element) as constituent elements, the method comprising calculating the relative energy of a cluster molecule by first-principles calculation, the cluster molecule having a structure in which one or more vanadium atoms in a cluster composed of vanadium sulfide unit cells are replaced by a specific foreign element; and evaluating the lithium ion secondary battery as having excellent cycle performance when the calculated relative energy is equal to or lower than that of vanadium sulfide not containing the foreign element.

Item 9. A method for predicting performance of a lithium ion secondary battery comprising, as an electrode active material for the lithium ion secondary battery, a foreign element-containing vanadium sulfide that comprises vanadium, sulfur, and an element other than vanadium and sulfur (foreign element) as constituent elements, the method comprising calculating at least one parameter of a cluster molecule by first-principles calculation, the cluster molecule having a structure in which one or more vanadium atoms in a cluster composed of vanadium sulfide unit cells are replaced by a specific foreign element, the parameter being at least one member selected from the group consisting of electronic density of states, band gap, and relationship between the valence band maximum (VBM) and the conduction band minimum (CBM) of the cluster molecule; and evaluating the lithium ion secondary battery as having excellent electrochemical performance when the electronic conductivity of the foreign element-containing vanadium sulfide obtained from the calculation result is equal to or higher than that of vanadium sulfide not containing the foreign element.

Item 10. A performance prediction method that is a method for selecting a foreign element to be present in a foreign element-containing vanadium sulfide that comprises, as constituent elements, vanadium, sulfur, and an element other than vanadium and sulfur (foreign element), the method comprising calculating the relative energy of a cluster molecule by first-principles calculation, the cluster molecule having a structure in which one or more vanadium atoms in a cluster composed of vanadium sulfide unit cells are replaced by a specific foreign element; and selecting the foreign element when the calculated relative energy is equal to or lower than that of vanadium sulfide not containing the foreign element.

Item 11. A performance prediction method that is a method for selecting a foreign element to be present in a foreign element-containing vanadium sulfide that comprises, as constituent elements, vanadium, sulfur, and an element other than vanadium and sulfur (foreign element), the method comprising calculating at least one parameter of a cluster molecule by first-principles calculation, the cluster molecule having a structure in which one or more vanadium atoms in a cluster composed of vanadium sulfide unit cells are replaced by a specific foreign element, the parameter being at least one member selected from the group consisting of electronic density of states, band gap, and relationship between the valence band maximum (VBM) and the conduction band minimum (CBM) of the cluster molecule; and selecting the foreign element when the electronic conductivity of the foreign element-containing vanadium sulfide obtained from the calculation result is equal to or higher than that of vanadium sulfide not containing the foreign element.

Advantageous Effects of Invention

The foreign element-containing vanadium sulfide of the present invention can provide an electrode active material for a lithium ion secondary battery with sufficiently high initial capacity and improved electrochemical performance or cycle performance.

DESCRIPTION OF EMBODIMENTS

Figure 1:
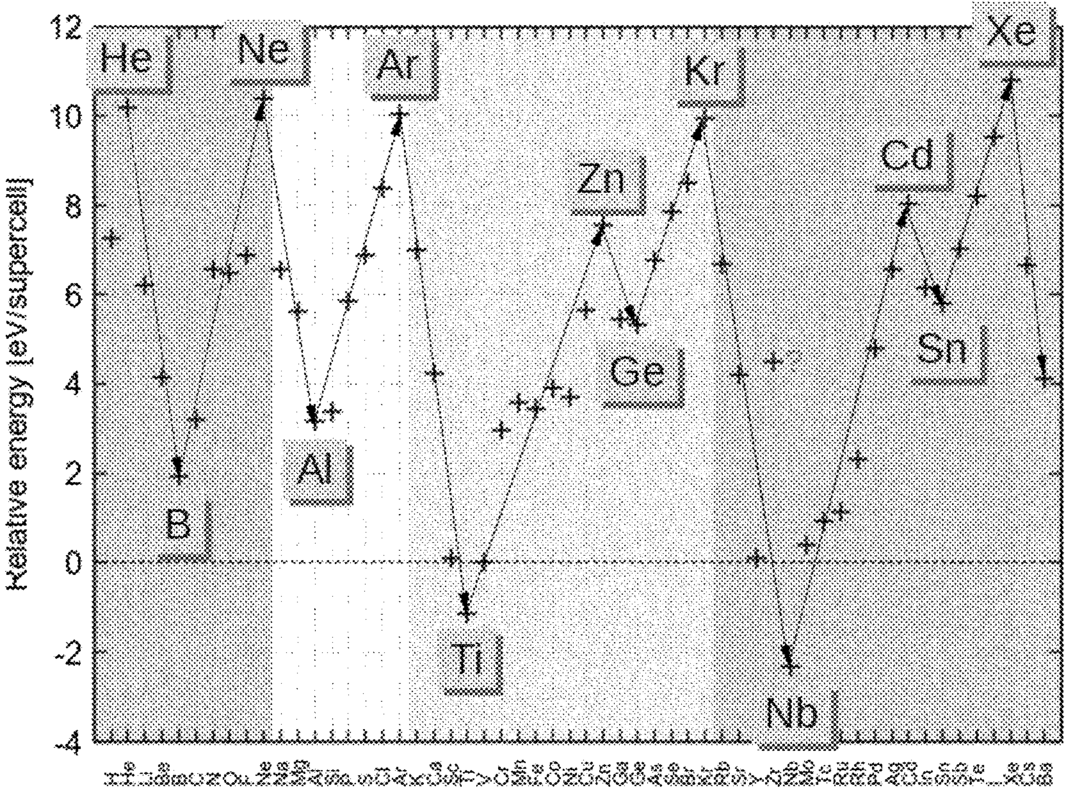
FIG. 1 shows relative energies of cluster molecules calculated by first-principles calculation, each cluster molecule having a structure in which one vanadium atom per eight vanadium atoms in a cluster composed of 8 units of $VS_4$ unit cells is replaced by a specific foreign element.

In the present specification, the terms "comprise," "contain," and "include" encompass the concepts of comprising, consisting essentially of, and consisting of.

In the present specification, a numerical range indicated by "A to B" means A or more and B or less.

Further, in the present specification, the concept of "lithium ion secondary battery" also includes lithium secondary batteries containing lithium metal as an anode active material.

1. Foreign Element-Containing Vanadium Sulfide

The foreign element-containing vanadium sulfide of the present invention comprises, as constituent elements, vanadium, sulfur, and at least one element other than vanadium and sulfur (foreign element), wherein the compositional ratio of the foreign element to the vanadium (M1/V or M2/V) is in the range of 0.05 to 1.5 in terms of molar ratio, and the compositional ratio (S/V) of the sulfur to the vanadium is in the range of 3.0 to 10.0 in terms of molar ratio.

The low-crystalline vanadium sulfide containing a foreign element according to a first embodiment of the present invention comprises at least one element selected from the group consisting of Nb, Ti, Zr, Mo, Sc, and Y as the foreign element. Based on this structural feature, the present invention can provide an electrode active material for a lithium ion secondary battery with sufficiently high initial capacity and improved cycle performance.

To improve cycle performance, structural stabilization in the foreign element-containing vanadium sulfide of the present invention is important. If the structure is stable in lithium insertion and extraction during charge-discharge cycling, the capacity can be maintained. Although the details will be described later, the structural stability can be evaluated by first-principles calculation of relative energy based on to what degree the relative energy of vanadium sulfide containing a foreign element increases or decreases as compared to that of vanadium sulfide not containing the foreign element. As a result, whether the electrode active material for a lithium ion secondary battery has excellent cycle performance can be evaluated. From this result, it can be concluded that cycle performance can be improved by incorporating at least one member selected from the group consisting of Nb, Ti, Zr, Mo, Sc, and Y as a foreign element.

The low-crystalline vanadium sulfide containing a foreign element according to a second embodiment of the present invention contains at least one member selected from the group consisting of Li, B, N, O, F, Mg, S, Cl, Ca, Br, Sr, Sc, I, Fe, Co, Ni, Zn, Y, Mo, Tc, and Cd as the foreign element. Containing such a foreign element can provide an electrode active material for a lithium ion secondary battery with sufficiently high initial capacity and improved electrochemical performance.

To improve electrochemical performance, the improvement of electronic conductivity of the foreign element-containing vanadium sulfide of the present invention is important. Although the details will be described later, electrochemical performance can be evaluated from first-principles calculation of relative energies based on to what degree the electronic conductivity of vanadium sulfide containing a foreign element increases or decreases as compared to that of vanadium sulfide not containing the foreign element. It can be concluded from this result that electrochemical performance can be improved by incorporating at least one element selected from the group consisting of Li, B, N, F, Mg, S, Cl, Ca, Br, Sr, Sc, I, Fe, Co, Ni, Zn, Y, Mo, Tc, and Cd as a foreign element.

More specifically, the foreign element-containing vanadium sulfide of the present invention preferably has a composition represented by formula (1):

$$V(M1_xM2_{(1-x)})_yS_z \quad (1)$$

(wherein x represents 0 to 1, y represents 0.05 to 1.5, z represents 3.0 to 10.0, M1 represents at least one member selected from the group consisting of Nb, Ti, Zr, Mo, Sc, and Y, and M2 represents at least one member selected from the group consisting of Li, B, N, O, F, Mg, S, Cl, Ca, Br, Sr, Sc, I, Fe, Co, Ni, Zn, Y, Mo, Tc, and Cd).

Thus, the foreign element-containing vanadium sulfide of the present invention has a high ratio of sulfur to vanadium in terms of elemental ratio. Therefore, the foreign element-containing vanadium sulfide of the present invention has a high initial charge-discharge capacity. The foreign element-containing vanadium sulfide of the present invention contains a specific foreign element and can thereby improve electrochemical performance or cycle performance.

As can be understood from formula (1) above, it is also possible for the vanadium sulfide of the present invention to contain both a foreign element described above in the first embodiment and a foreign element described above in the second embodiment in combination. In this case, the obtained vanadium sulfide of the present invention can achieve both the effects of the first and second embodiments and can also improve both electrochemical performance and cycle performance, while having a high initial charge-discharge capacity. The ratio of the foreign element M2 in the second embodiment to the foreign element M1 in the first embodiment is not particularly limited. From the standpoint of electrochemical performance and cycle performance, x in formula (1) is preferably 0 to 1, more preferably 0.1 to and even more preferably 0.2 to 0.8.

In the present invention, electrochemical performance and cycle performance can be particularly improved by adjusting the foreign element content (y value; the total foreign element content when multiple foreign elements are present). Therefore, y is preferably in the range of 0.05 to 1.5, more preferably 0.08 to 1.4, and even more preferably 0.1 to 1.3.

In the present invention, the higher the sulfur content (the larger z is), the higher the specific capacity tends to be. The lower the sulfur content (the smaller z is), the higher electrochemical performance tend to be. Higher cycle performances tend to be achieved by lowering the amount of elemental sulfur that may possibly be contained. From the viewpoint of balancing these factors, z is preferably 3.0 to 10.0, more preferably 3.5 to 9.0, and particularly preferably 4.0 to 8.0.

Although the relationship between the y value and z value is not particularly limited, z=4(y+1) is preferable in terms of, for example, charge-discharge capacity, electrochemical performance, electronic conductivity, and cycle performance.

The foreign element-containing vanadium sulfide of the present invention has a crystalline vanadium tetrasulfide $VS_4$ (patronite) crystal structure (also referred to below as "$VS_4$ crystal structure"). Although the foreign element-containing vanadium sulfide is a sulfide having a high sulfur ratio in the average composition, little sulfur is present in the form of elemental sulfur and sulfur is bound to vanadium and a foreign element (M1 or M2) and forms a sulfide. Therefore, formation of by-products is suppressed, and charging and discharging proceed reversibly even as compared with vanadium sulfide not containing a foreign element. Thus, as compared with conventional vanadium sulfides, which have only a V-S bond, the foreign element-containing vanadium sulfide of the present invention has a V-S bond and a M1-S bond. This increase in the number of bonds to sulfur atoms is considered to further suppress dissolution of sulfur atoms during charging and discharging and formation of by-products derived from sulfur atoms and improve the reversibility of the structure, thus achieving improved cycle performance. Further, it is thought that due to the presence of the M2-S bond, a density of states not previously present in the band gap appears and contributes to improved electronic conductivity, thus increasing the active material utilization (%) during charging and discharging and providing an electrode material with excellent electrochemical performance.

In the present invention, other impurities can also be contained as long as they do not interfere with the performance of the foreign element-containing vanadium sulfide of the present invention. Examples of such impurities include a foreign element-containing compound, vanadium sulfide (e.g., $V_2S_3$ and $VS_4$), and the like that are used as starting materials; foreign element carriers, vanadium, and the like that may be mixed into starting materials; and oxygen and the like that may be mixed into starting materials or mixed during production.

The amount of these impurities contained is preferably within the range that does not interfere with the performance of the foreign element-containing vanadium sulfide of the present invention. Generally, the amount of impurities is preferably not more than 2 mass % (0 to 2 mass %), and more preferably not more than 1.5 mass % (0 to 1.5 mass %), based on the total amount of the foreign element-containing vanadium sulfide of the present invention taken as 100 mass %. Among the impurities, the elemental sulfur content is preferably as low as possible, as described above.

Thus, in view of sufficiently high initial capacity and improved electrochemical performance or cycle performance, the foreign element-containing vanadium sulfide of the present invention is useful as an electrode active material for a lithium ion secondary battery (in particular, a cathode active material for a lithium ion secondary battery).

The foreign element-containing vanadium sulfide of the present invention can be produced in the same manner as with usual methods except that appropriate starting materials are used. Examples of usual methods include hand mixing and mechanical milling processes. The production conditions can also be performed according to usual methods except for using appropriate starting materials.

2. Method for Predicting Performance of Foreign Element-Containing Vanadium Sulfide and Method for Selecting Foreign Element The method currently used for confirming whether the electrochemical performance and cycle performance described above are improved is a method comprising adding each of various foreign elements by trial and error based on, for example, the researcher's intuition and measuring the actual performance of the thus synthesized products for the confirmation. However, for example, since the composition that can be synthesized and the route are limited by the available starting materials and optimizing the amount to be added has not been achieved, there is much room for improvement as a synthesis method. Accordingly, for efficient and systematic development, it is necessary to advance material development while simultaneously using, for example, performance predictions based on theoretical backgrounds.

Figure 2:
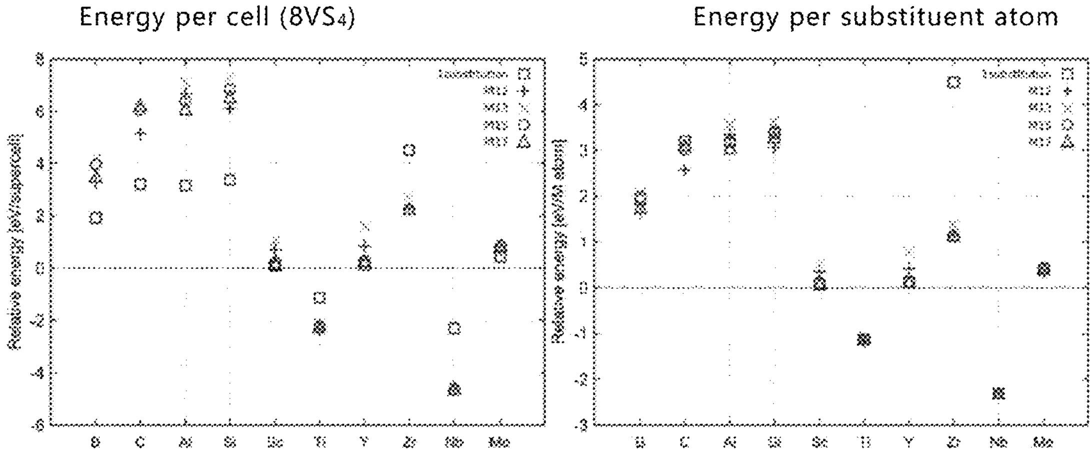
FIG. 2 shows relative energies of cluster molecules calculated by first-principles calculation, each cluster molecule having a structure in which two vanadium atoms per eight vanadium atoms in a cluster composed of 8 units of $VS_4$ unit cells are replaced by specific foreign elements.

To improve cycle performance, structural stabilization in the foreign element-containing vanadium sulfide of the present invention is important. If the structure is stable even in lithium insertion and desorption during charge-discharge cycling, the capacity can be maintained. For example, FIGS. 1 and 2 show relative energies of cluster molecules each having a structure in which one or more vanadium atoms in a cluster composed of 8 units of $VS_4$ unit cells are replaced by one or more specific foreign elements. It can be concluded from FIGS. 1 and 2 that relative energies are relatively low in the systems to which Nb, Ti, Zr, Mo, Sc, or Y was added, and that the addition of such a foreign element can stabilize the structure and improve the cycle performance. That is, by calculating the relative energy of a cluster molecule having a structure in which a vanadium atom in a cluster composed of a predetermined number of vanadium sulfide unit cells (e.g., 8 units) is replaced by a specific foreign element, cycle performance of a lithium ion battery comprising the foreign element-containing vanadium sulfide of the present invention as an electrode active material for a lithium ion secondary battery can be presumed. When the calculated relative energy of vanadium sulfate containing a foreign element is equal to or lower than vanadium sulfate not containing the foreign element, the foreign element is selected as providing a foreign element-containing vanadium sulfate that can improve cycle performance.

Figure 3:
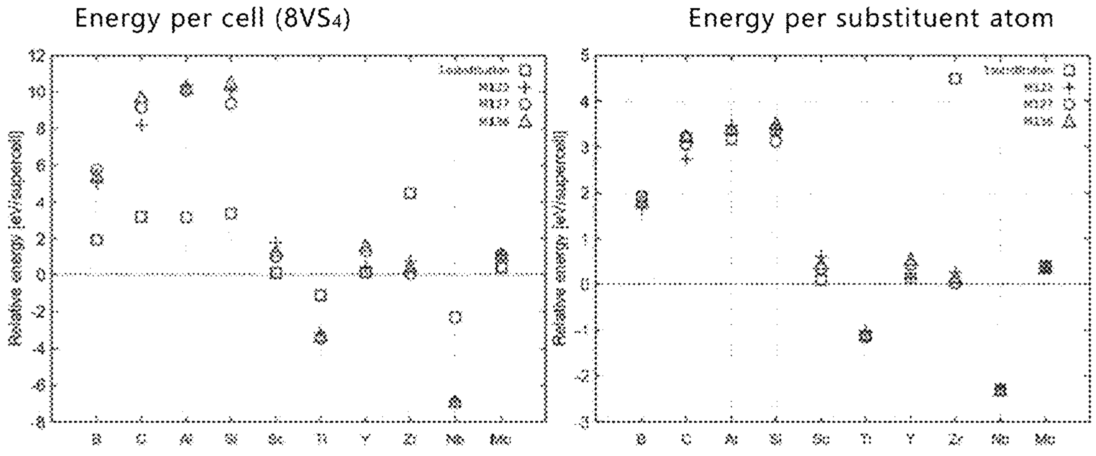
FIG. 3 shows relative energies of cluster molecules calculated by first-principles calculation, each cluster molecule having a structure in which three vanadium atoms per eight vanadium atoms in a cluster composed of 8 units of $VS_4$ unit cells are replaced by specific foreign elements.
Figure 4:
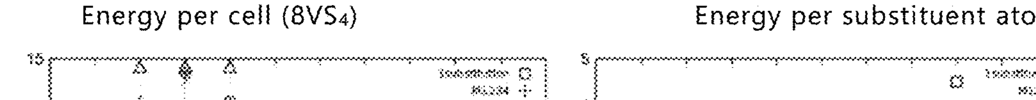
FIG. 4 shows relative energies of cluster molecules calculated by first-principles calculation, each cluster molecule having a structure in which four vanadium atoms per eight vanadium atoms in a cluster composed of 8 units of $VS_4$ unit cells are replaced by specific foreign elements.
Figure 4:
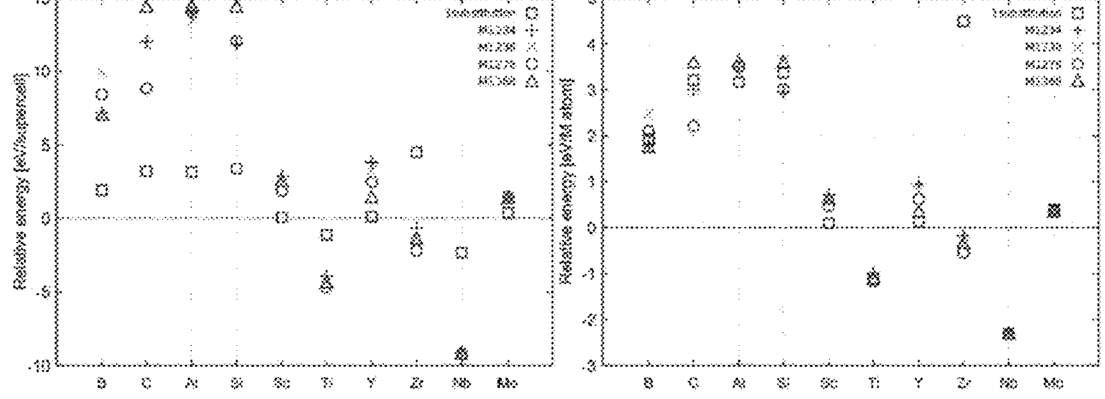
Figure 5:
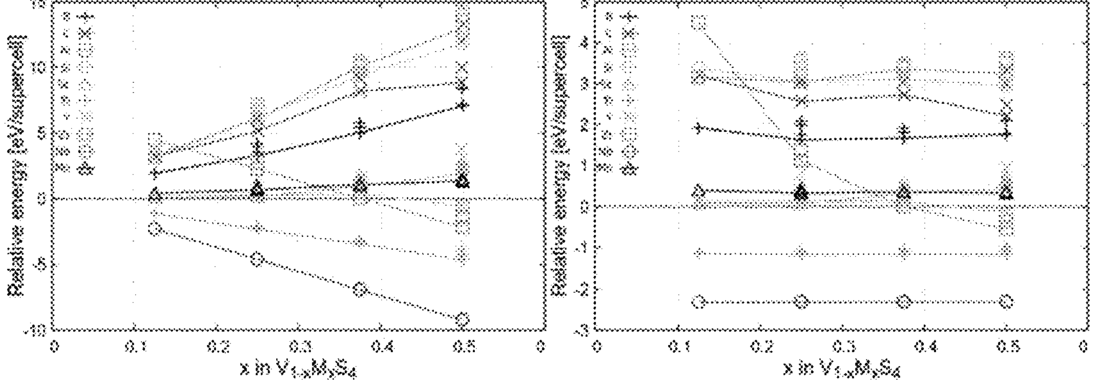
FIG. 5 shows relative energies of cluster molecules calculated by first-principles calculation, each cluster molecule having a structure in which one to four vanadium atoms per eight vanadium atoms in a cluster composed of 8 units of $VS_4$ unit cells are replaced by specific foreign elements.

To improve electrochemical performance, it is important for the foreign element-containing vanadium sulfide of the present invention to have improved electronic conductivity. For example, FIG. 3 shows the electronic density of states of cluster molecules each having a structure in which vanadium atoms in a cluster composed of 8 units of $VS_4$ unit cells are replaced by specific foreign elements. FIG. 4 shows the band gaps. FIG. 5 shows the relationship between the valence band maximum (VBM) and the conduction band minimum (CBM). It can be understood from FIGS. 3 to 5 that the density of states in the band gap appears in the systems to which Li, B, N, O, F, Mg, S, Cl, Ca, Br, Sr, Sc, I, Fe, Co, Ni, Zn, Y, Mo, Tc, or Cd was added, and electronic conductivity can be improved by adding these foreign elements. That is, the electronic conductivity of the foreign element-containing vanadium sulfide of the present invention and the electrochemical performance of a lithium ion secondary battery comprising the foreign element-containing vanadium sulfide of the present invention as an electrode active material for lithium ion secondary batteries can be estimated by calculating, for example, the electronic density of states, band gaps, and/or the relationship between the valence band maximum (VBM) and the conduction band minimum (CBM) of a cluster molecule having a structure in which a vanadium atom in a cluster composed of a predetermined number of units (e.g., 8 units) of vanadium sulfate unit cells is replaced by a specific foreign element. When vanadium sulfate containing a foreign element has an electronic conductivity equal to or lower than that of vanadium sulfate not containing the foreign element, the foreign element can be selected as providing a foreign element-containing vanadium sulfate that can improve electrochemical performance.

3. Use of Foreign Element-Containing Vanadium Sulfide

The foreign element-containing vanadium sulfide of the present invention described above achieves sufficiently high initial capacity and improved cycle performance or electrochemical performance as described above. Therefore, the foreign element-containing vanadium sulfide of the present invention is particularly useful as an electrode active material for a lithium ion secondary battery. Lithium ion secondary batteries in which the foreign element-containing vanadium sulfide of the present invention can be effectively used as an electrode active material (in particular, a cathode active material) may be non-aqueous electrolyte solution lithium ion secondary batteries comprising a non-aqueous electrolyte solution as an electrolyte, or all-solid-state lithium ion secondary batteries comprising a lithium ion-conductive solid electrolyte.

The non-aqueous electrolyte lithium ion secondary batteries and all-solid-state lithium ion secondary batteries may have the same structures as known lithium ion secondary batteries except that the foreign element-containing vanadium sulfide of the present invention is used as an electrode active material (in particular, a cathode active material).

For example, the non-aqueous electrolyte lithium ion secondary batteries may have the same basic structures as known non-aqueous electrolyte lithium ion secondary batteries except that the foreign element-containing vanadium sulfide of the present invention is used as an electrode active material (in particular, a cathode active material).

When the foreign element-containing vanadium sulfide of the present invention is used as a cathode active material, the cathode may have the same structure as a known cathode except that the foreign element-containing vanadium sulfide of the present invention is used as a cathode active material. For example, a cathode composite containing the foreign element-containing vanadium sulfide of the present invention and optionally further containing a conductive agent and a binder may be supported on a cathode current collector, such as aluminum, nickel, stainless steel, or carbon cloth. Examples of conductive agents include carbon materials, such as graphite, coke, carbon black (e.g., Ketjenblack), and acicular carbon. Examples of binders include polyvinylidene fluoride (PVDF), polytetrafluoroethylene (PTFE), polyimide (PI), polyamide, polyamideimide, polyacrylic resin, styrene-butadiene rubber (SBR), styrene-ethylene-butylene-styrene copolymers (SEBS), carboxymethyl cellulose (CMC), and the like. These materials may be used singly or in a combination of two or more. When the foreign element-containing vanadium sulfide of the present invention is not used as a cathode active material, known cathode active materials, such as lithium cobalt oxide ($LiCoO_2$), lithium nickel oxide ($LiNiO_2$), lithium manganese oxide ($LiMn_2O_4$), lithium iron phosphate ($LiFePO_4$), vanadium oxide-based materials, and sulfur-based materials can be used as cathode active materials.

When the foreign element-containing vanadium sulfide of the present invention is used as an anode active material, the anode may have the same structure as a known anode except that the foreign element-containing vanadium sulfide of the present invention is used as an anode active material. For example, an anode composite containing the foreign element-containing vanadium sulfide of the present invention and optionally further containing a conductive agent and a binder may be supported on an anode current collector, such as aluminum, nickel, stainless steel, or carbon cloth. Examples of conductive agents include carbon materials such as graphite, coke, carbon black, and acicular carbon. Examples of binders include polyvinylidene fluoride (PVDF), polytetrafluoroethylene (PTFE), polyimide (PI), polyamide, polyamideimide, polyacryl, styrene-butadiene rubber (SBR), styrene-ethylene-butylene-styrene copolymers (SEBS), carboxymethyl cellulose (CMC), and the like. These materials may be used singly or in a combination of two or more. When the foreign element-containing vanadium sulfide of the present invention is not used as an anode active material, known anode active materials, such as metallic lithium, carbon-based materials (e.g., activated carbon and graphite), silicon, silicon oxide, Si—SiO-based materials, and lithium titanium oxide can be used as anode active materials.

Examples of solvents for non-aqueous electrolytes include solvents known as solvents for non-aqueous lithium ion secondary batteries, such as carbonates, ethers, nitriles, and sulfur-containing compounds. In particular, when elemental sulfur is used as a cathode active material, neither carbonates nor ethers can be used as a solvent. This is because a carbonate, if used as a solvent, reacts with elemental sulfur, whereas an ether, if used as a solvent, causes dissolution of a large amount of a sulfur component in an electrolyte solution, thus incurring performance degradation. In contrast, the foreign element-containing vanadium sulfide of the present invention, when used as an electrode active material (in particular, a cathode active material), can solve these problems and make any of the solvents applicable, thus enhancing the selectivity of solvent used in the electrolyte solution.

As a separator, for example, a material that is made of a polyolefin resin, such as polyethylene or polypropylene, fluororesin, nylon, aromatic aramid, inorganic glass, or like materials and that is in the form of a porous membrane, a nonwoven fabric, a woven fabric, or the like can be used.

The all-solid-state lithium ion secondary batteries can also have the same structures as known all-solid-state lithium ion secondary batteries except that the foreign element-containing vanadium sulfide of the present invention is used as an electrode active material (in particular, a cathode active material). In this case, as a cathode, an anode, and a separator, those mentioned above can be used.

In this case, examples of usable electrolytes include polymer solid electrolytes, such as polyethylene oxide polymer compounds, and polymer compounds comprising at least one member selected from the group consisting of polyorganosiloxane chains and polyoxyalkylene chains; sulfide solid electrolytes; oxide solid electrolytes; and the like.

The nonaqueous electrolyte solution lithium ion secondary batteries and all-solid-state lithium ion secondary batteries may also be of any suitable shape, and can be, for example, cylindrical or square.

EXAMPLES

The present invention is described below in more detail with reference to Examples, but is not limited to the Examples below.

Example 1: Relative Energy Calculation by First-Principles Calculation

Cluster molecules each having a structure in which a vanadium atom in a cluster composed of eight units of $VS_4$ unit cells was replaced by a specific foreign element were prepared. The relative energy of each cluster molecule was calculated by first principles calculation using the VASP code.

Specifically, one vanadium atom per eight vanadium atoms in a cluster composed of 8 units of $VS_4$ unit cell units was replaced by a foreign element that is each element from a hydrogen atom to a barium atom in the periodic table. The relative energy was then calculated to evaluate whether the structures containing each foreign element as a substituent were stable.

For relative energy calculation, a cluster composed of 8 units of $VS_4$ unit cells was represented by $V_8S_{32}$, and the following reaction formula was assumed:

$$V_8S_{32} + M\ (\text{atom}) = MV_7S_{32} + V\ (\text{atom})$$

(wherein M represents a foreign element from a hydrogen atom to a barium atom in the periodic table, and (atom) represents an atom in an atomic state).

The relative energy was then calculated according to the following calculation formula:

$$dE = E(MV_7S_{32}) + xE(V\ (\text{atom})) - E(V_8S_{32}) - xE(M\ (\text{atom}))$$

(wherein dE represents relative energy;
$E(MV_7S_{32})$ represents the total energy of $MV_7S_{32}$;
$E(V_8S_{32})$ represents the total energy of $V_8S_{32}$;
E(V(atom)) represents the total energy of one vanadium atom in the vacuum cell (14.00 Å×14.01 Å×14.02 Å); and
E(M(atom)) represents the total energy of one foreign element in the vacuum cell (14.00 Å×14.01 Å×14.02 Å)).

In this calculation, the lattice was fixed and only the internal coordinates were relaxed. The energy at the time of ejecting one vanadium atom per eight vanadium atoms and inserting one foreign element M can be thereby calculated.

FIG. 1 shows the results. Further, FIGS. 2 to 5 show the results of relative energies calculated in the same manner as above by assuming the cases in which 1 to 4 vanadium atoms per 8 vanadium atoms were replaced by foreign elements selected from B, C, Al, Si, Sc, Ti, Y, Zr, Nb, and Mn, which were assumed to have low relative energy from the results shown in FIG. 1.

It can be understood from the results in FIG. 1 that the relative energy changes in a V-shape (parabolically) according to the periodic table. It can also be understood that noble gases are unstable. In $VS_4$, the formal valence of the vanadium atom is +4 (8 sulfur atoms are coordinated). The results show that when 4 sulfur atoms are coordinated, boron has a lower relative energy than carbon; that when 6 sulfur atoms are coordinated, aluminum has a lower relative energy than silicon; and when 8 sulfur atoms are coordinated, scandium has a lower relative energy than titanium. It can thus be understood that having a small ionic radius, a small coordination number, and a low valence leads to structural stabilization. The results further show that when zinc and cadmium, which have d10 electron configuration, were used as a foreign element, the resulting structures were unstable, whereas when germanium and tin, which have four electrons in s and p orbitals, were used, the resulting structures were relatively stable. Considering a combination of the results of FIG. 1 and those of FIGS. 2 to 5, it was found that the ascending order of the calculated relative energies was Nb<Ti<Sc, Y<Mo<Tc<Ru<B<Rh<Cr<C, Al<Si. That is, the relative energy is relatively low in the systems to which Nb, Ti, Zr, Mo, Sc, or Y were added. It can thus be concluded that the addition of these elements as a foreign element can stabilize the structure and improve cycle performance. In particular, when Nb or Ti is added, the relative energy can be reduced as compared to that of the original $VS_4$ and the structure can be stabilized, regardless of whether the amount of substitution is large or small; therefore, it can be understood that the addition of Nb and Ti contributes to the improvement of cycle performance. Further, when at least 4 vanadium atoms per 8 vanadium atoms are replaced by Zr atoms, the relative energy can be reduced as compared to that of the original $VS_4$ and the structure can be stabilized; therefore, it can be understood that adding an increased amount of Zr contributes to improvement of cycle performance.

Example 2: First-Principles Calculation of Electronic Structure and Bond Lengths Cluster molecules each having a structure in which a vanadium atom in a cluster composed of eight units of $VS_4$ unit cells was replaced by a specific foreign element were prepared. The electronic state and bond length of each cluster molecule were calculated by first-principles calculation using the VASP code.

Specifically, one vanadium atom per eight vanadium atoms in a cluster composed of 8 units of $VS_4$ unit cell units was replaced by a foreign element that is an element selected from a hydrogen atom to a barium atom in the periodic table. The electronic conductivity of the substituted structures was then calculated and estimated from the density of states (DOS), and the influence of the substituent elements on the atomic structure was calculated from M-S bond length and V-S bond length and by first-principles molecular dynamics (MD).

Figure 6:
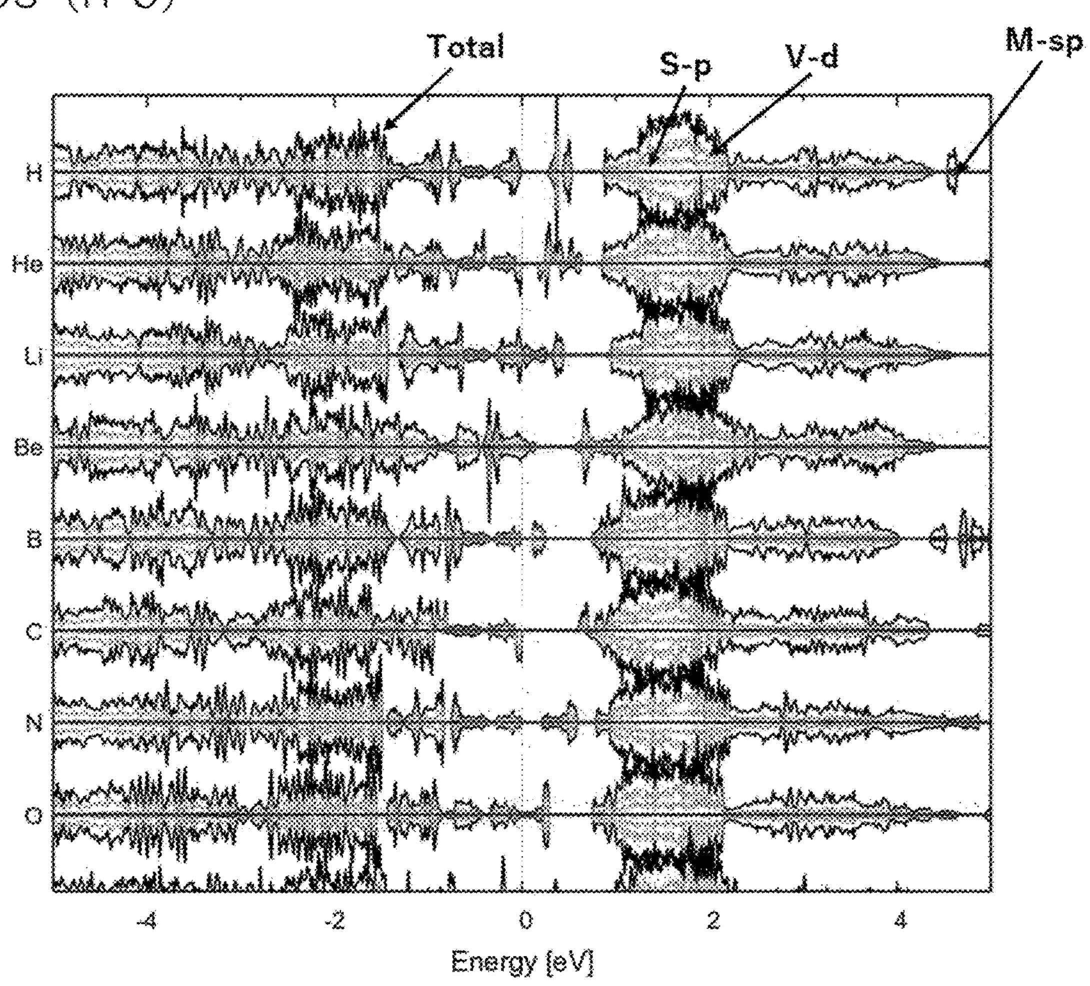
FIG. 6 shows the electronic density of states of cluster molecules calculated by first-principles calculation, each cluster molecule having a structure in which a vanadium atom in a cluster composed of 8 units of $VS_4$ unit cells is replaced by a specific foreign element.
Figure 6:
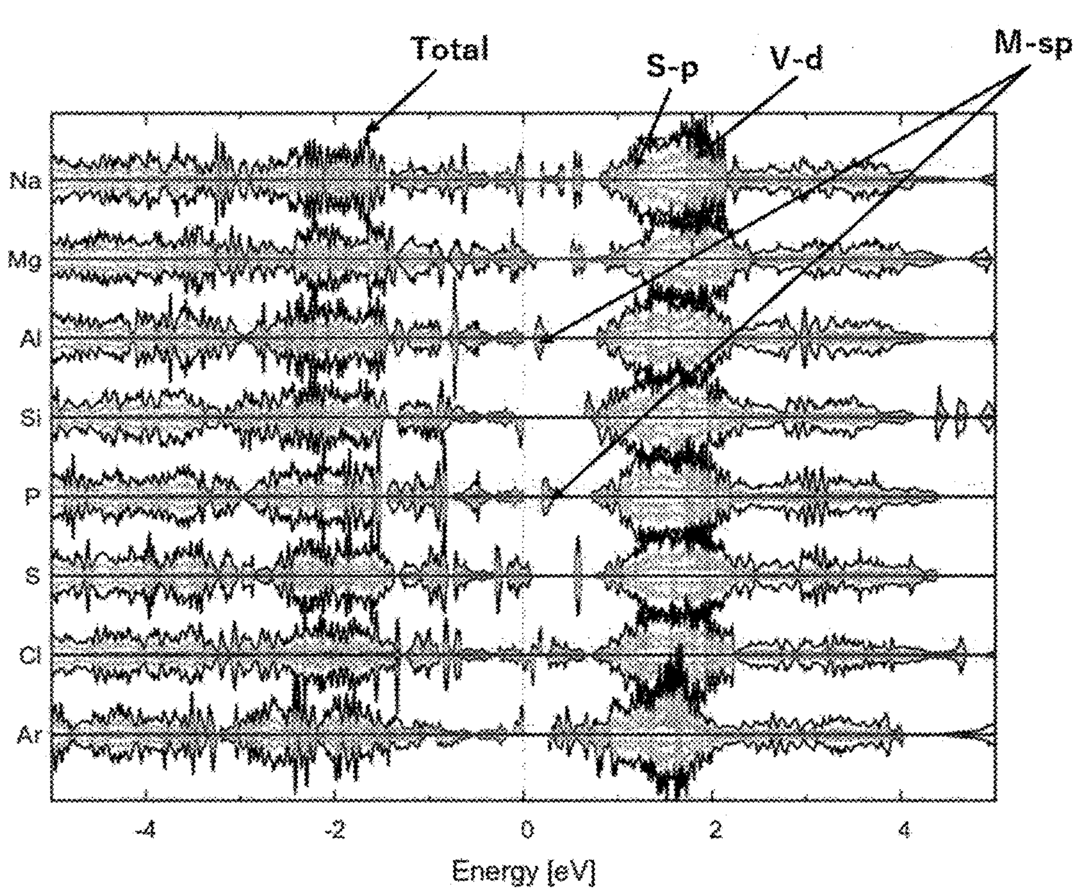
Figure 6:
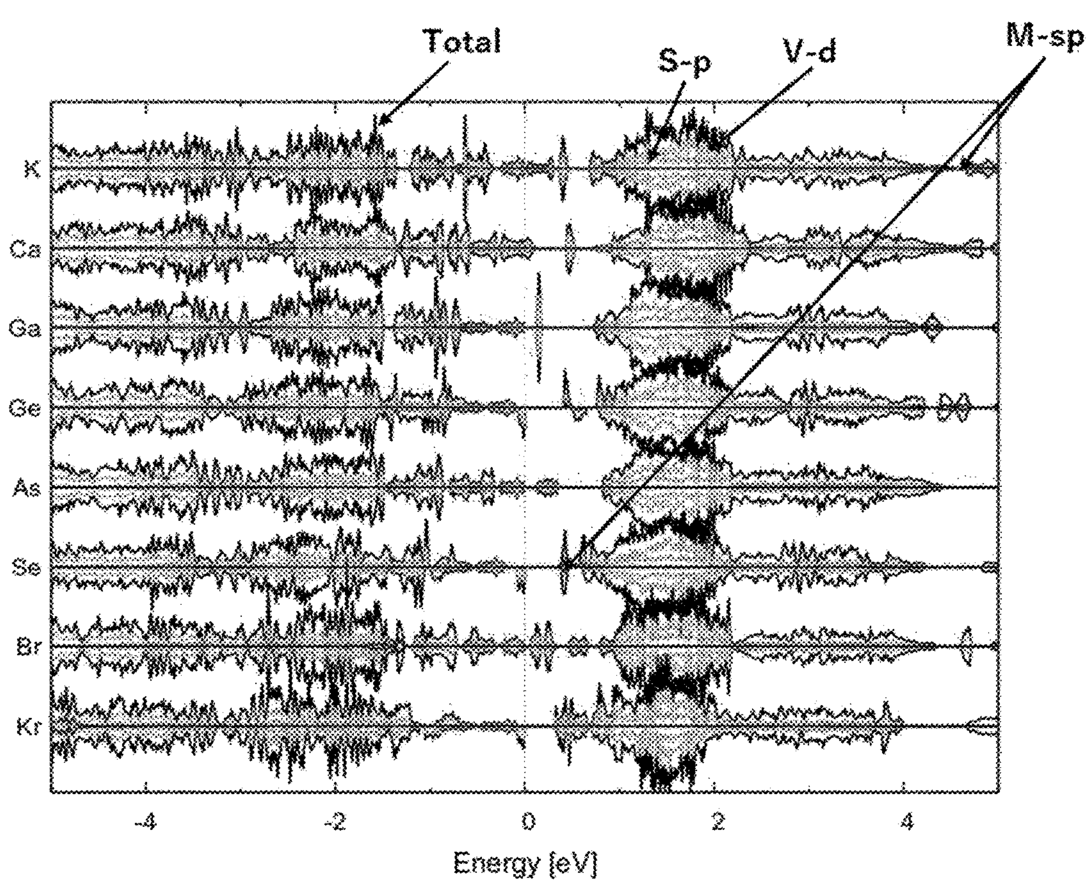
Figure 6:
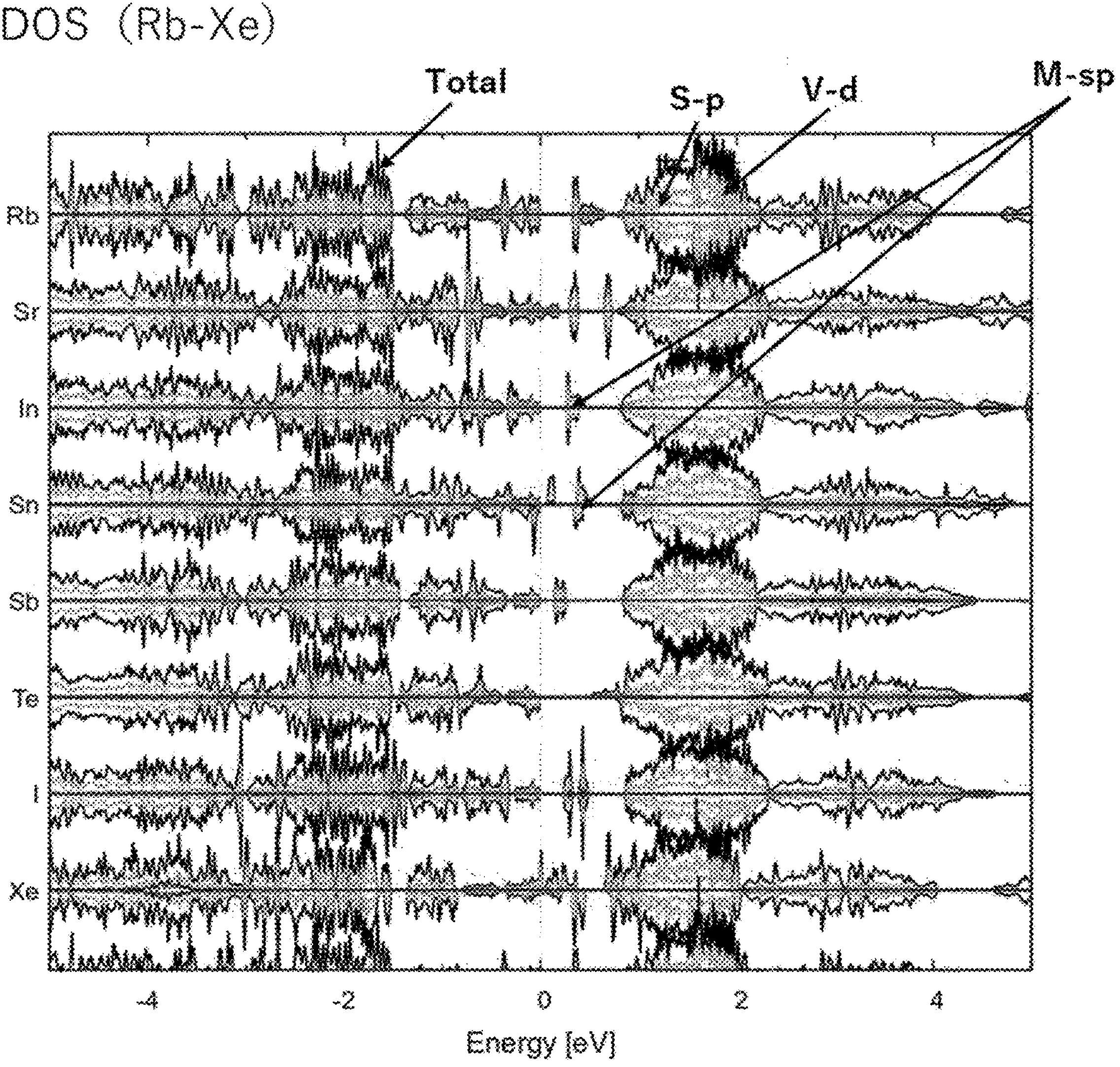
Figure 6:
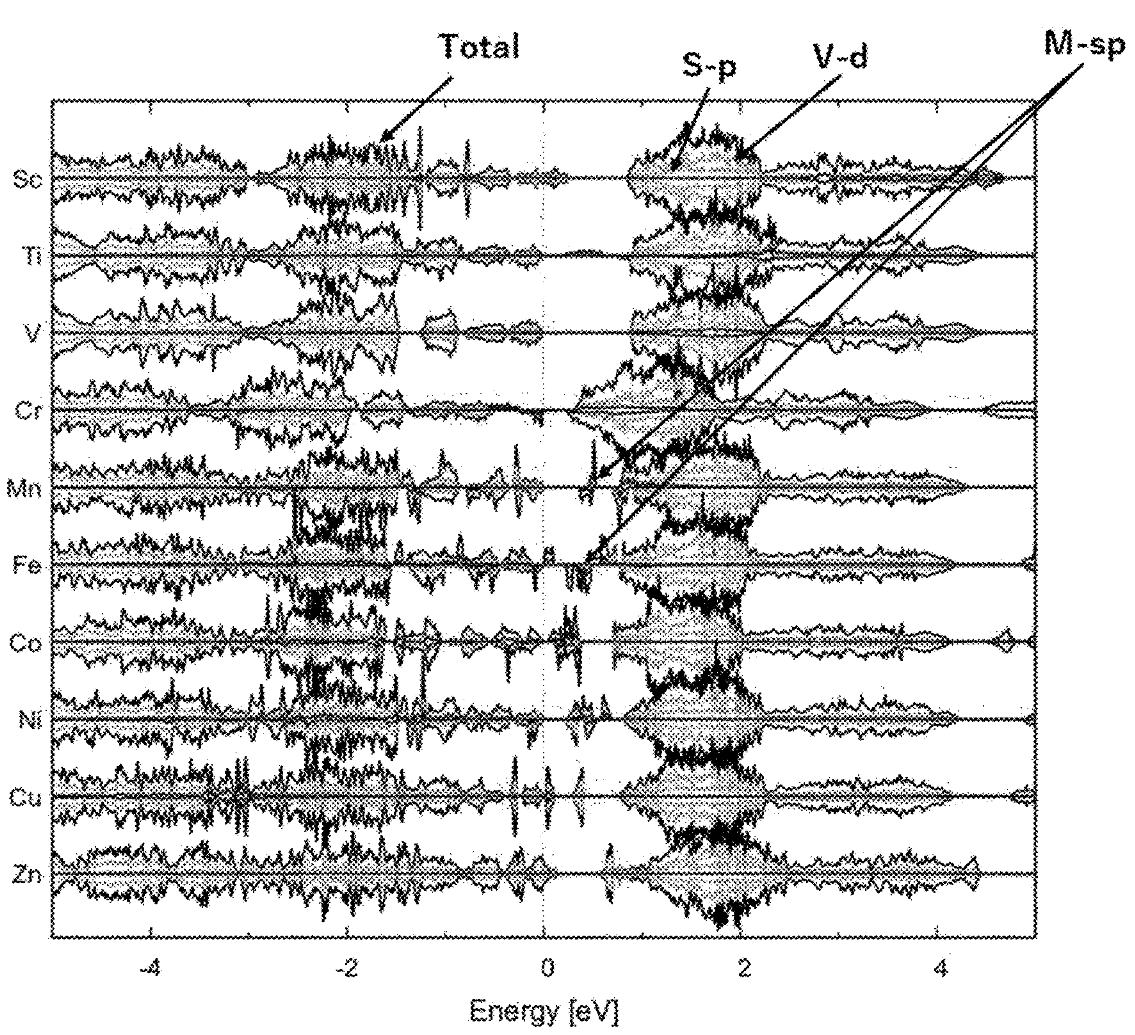
Figure 6:
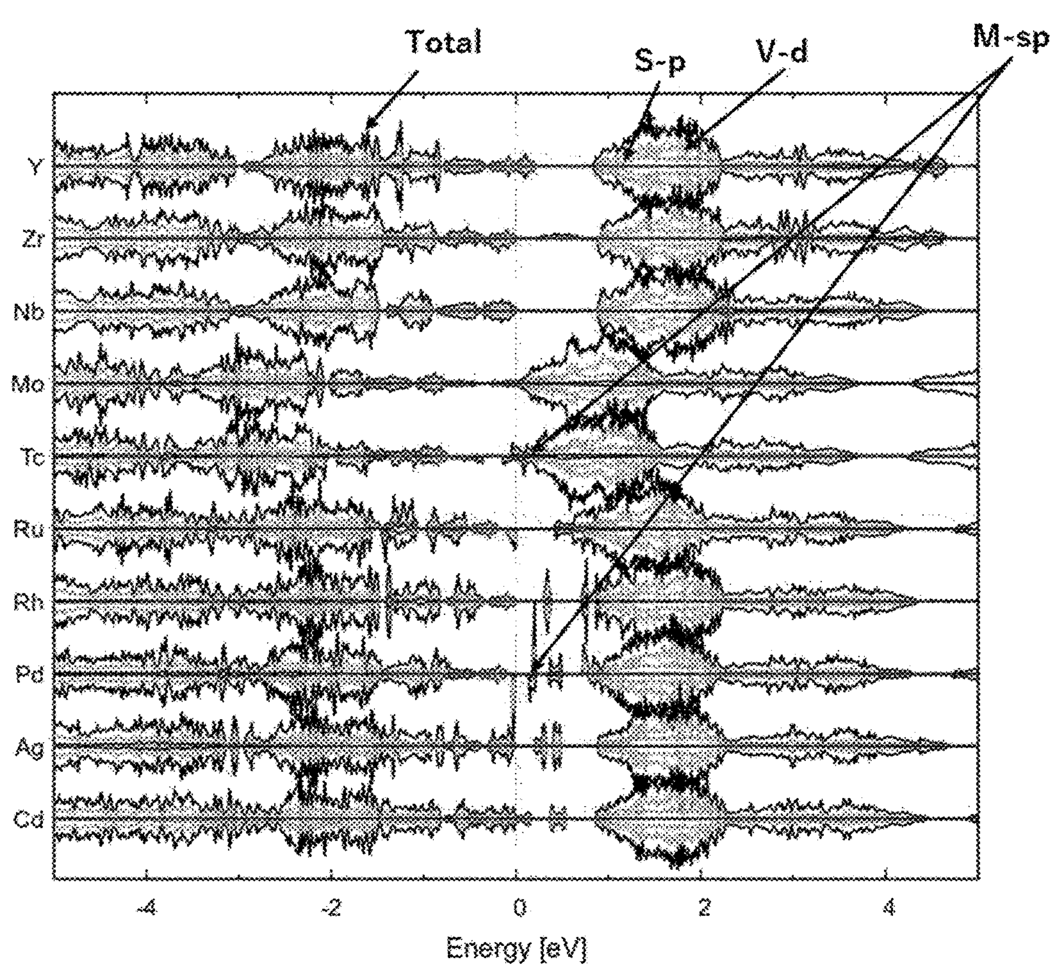
Figure 7:
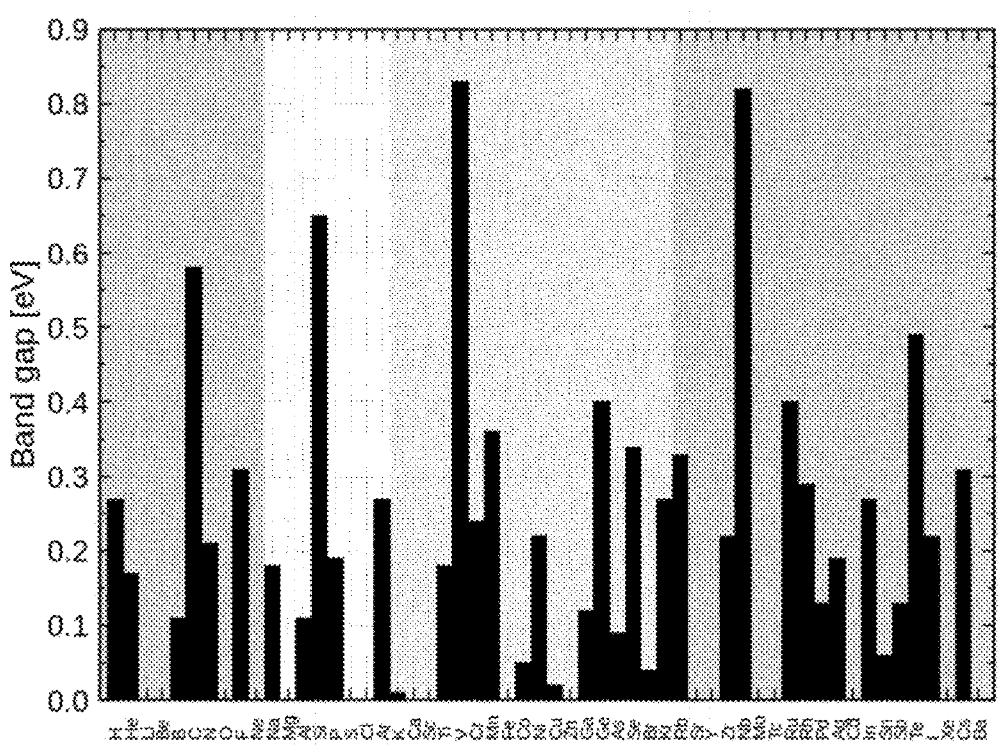
FIG. 7 shows the band gaps of cluster molecules calculated by first-principles calculation, each cluster molecule having a structure in which a vanadium atom in a cluster composed of 8 units of $VS_4$ unit cells is replaced by a specific foreign element.
Figure 8:
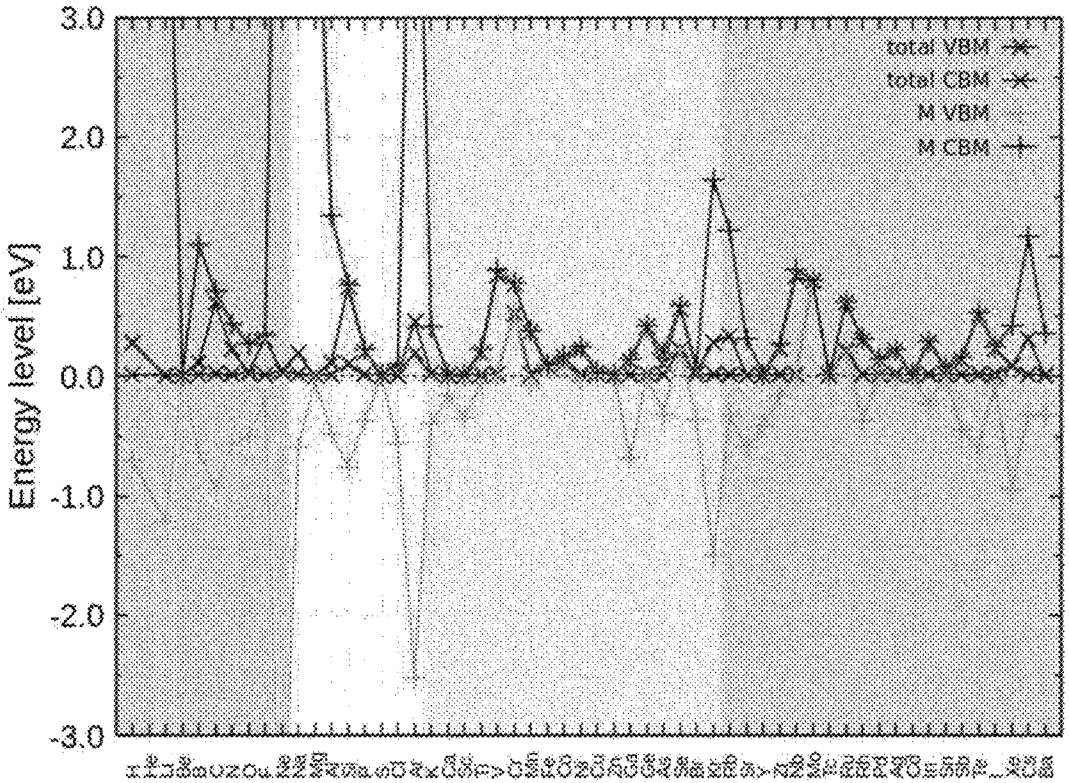
FIG. 8 shows the relationship between the valence band maximum (VBM) and the conduction band minimum (CBM) of cluster molecules calculated by first-principles calculation, each cluster molecule having a structure in which a vanadium atom in a cluster composed of 8 units of $VS_4$ unit cells is replaced by a specific foreign element.
Figure 9:
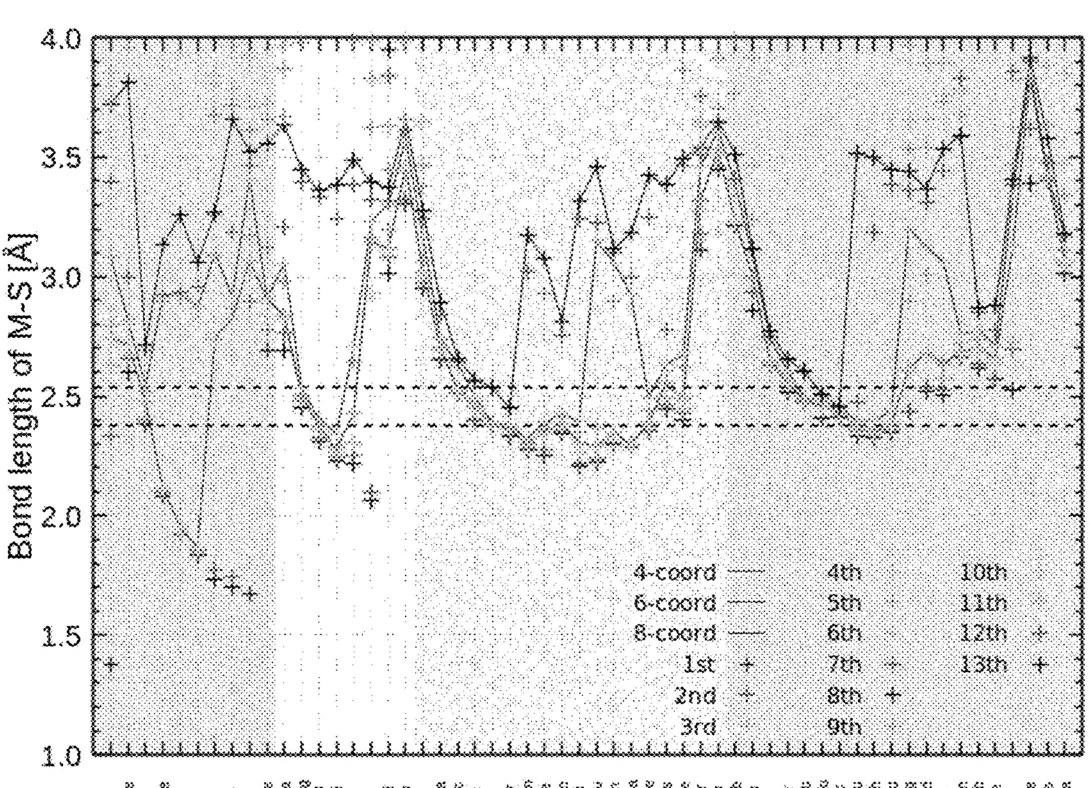
FIG. 9 shows the M-S bond length of cluster molecules (wherein M represents an added element) calculated by first-principles calculation, each cluster molecule having a structure in which a vanadium atom in a cluster composed of 8 units of $VS_4$ unit cells is replaced by a specific foreign element.
Figure 10:
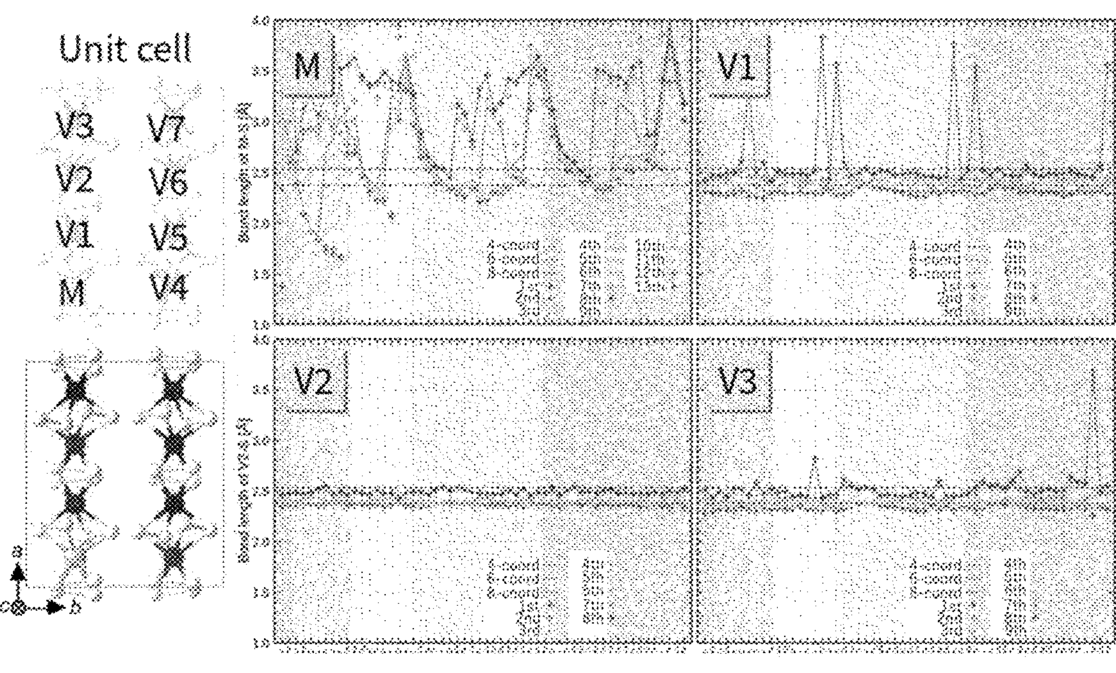
FIG. 10 shows the V-S bond length of cluster molecules calculated by first-principles calculation, each cluster molecule having a structure in which a vanadium atom in a cluster composed of 8 units of $VS_4$ unit cells is replaced by a specific foreign element.
Figure 10:
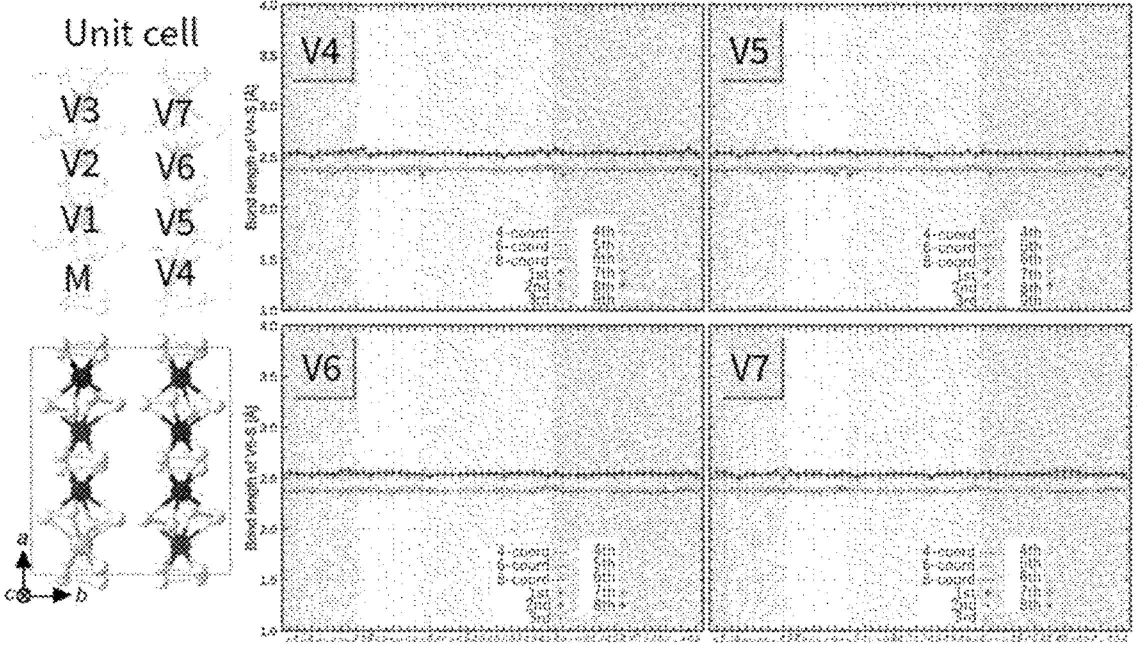
Figure 11:
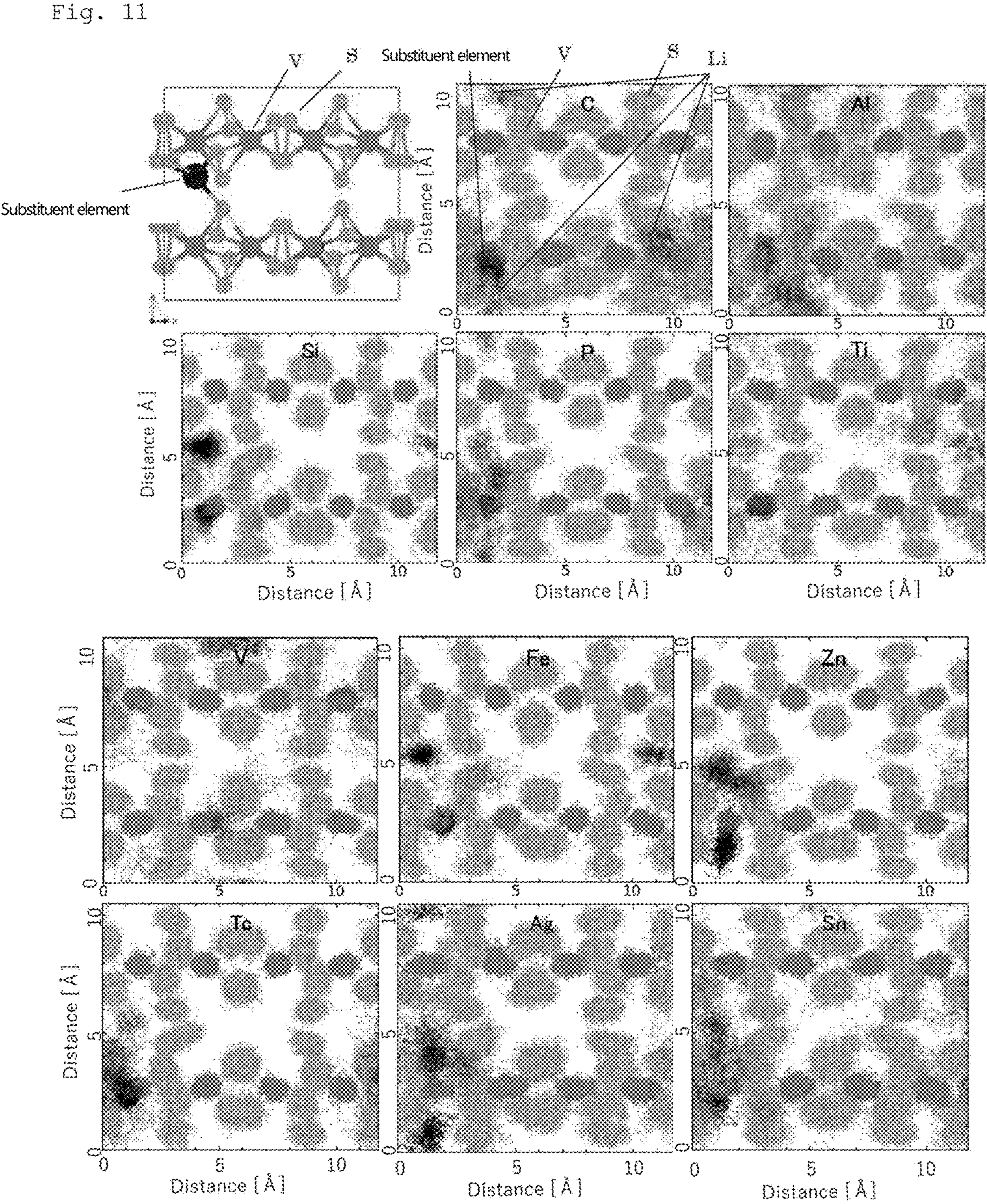
FIG. 11 shows the results of MD (1000 K, 50 ps) (Part 1) of cluster molecules calculated by first-principles calculation, each cluster molecule having a structure in which a vanadium atom in a cluster composed of 8 units of $VS_4$ unit cells is replaced by a specific foreign element.
Figure 12:
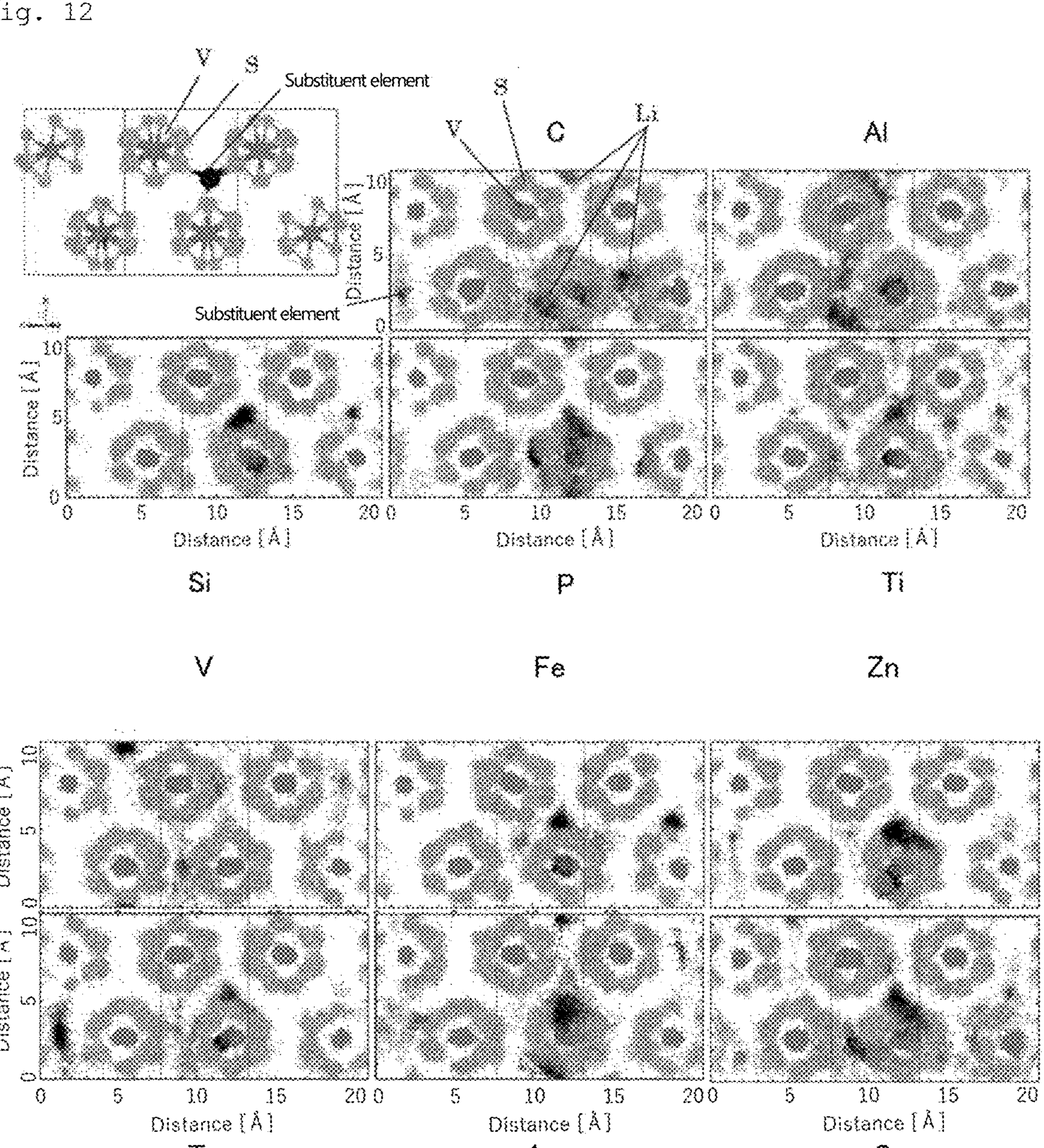
FIG. 12 shows the results of MD (1000 K, 50 ps) (Part 2) of cluster molecules calculated by first-principles calculation, each cluster molecule having a structure in which a vanadium atom in a cluster composed of 8 units of $VS_4$ unit cells is replaced by a specific foreign element.

FIG. 6 shows the electronic density of states of cluster molecules each having a structure in which a vanadium atom is replaced by a specific foreign element. FIG. 7 shows the band gaps. FIG. 8 shows the relationship between the valence band maximum (VBM) and the conduction band minimum (CBM). FIG. 9 shows the M (added elements)-S bond length. FIG. 10 shows V-S bond length. FIGS. 11 and 12 show the results of MD (1000 K, 50 ps).

It can be understood from FIG. 6 that homologous elements in the periodic table have generally similar electronic states. Among these, V and Nb have a gap of slightly less than 1 eV, and the valence band maximum (VBM) and the conduction band minimum (CBM) are mainly contributed by the d-orbital of V. When an element is substituted, a new energy level is created in the gap. Elements in which a state of crossing the Fermi level is present (i.e., metallic elements) are B, O, Ne, Mg, S, Cl, Ca, Sc, Zn, Sr, Y, Mo, Tc, and Cd, whereas elements having a very small band gap (0 to 0.2 eV) are Li, Be, Na, Al, P, K, Ga, As, Br, Fe, Co, Cu, Pd, Ag, Sn, and Sb.

In FIG. 7, including the state of crossing the Fermi level or having a band gap of 0.01 eV or less is indicated as a band gap of 0 eV. As a result, the descending order of the band gap is V>Nb>Si>C>Te, and the rest of the elements all had a band gap that is half or less than half of the band gap of $VS_4$ (0.83 eV).

FIG. 8 shows numerical data on the valence band maximum (VBM) and the conduction band minimum (CBM) of the entire cell and those of each substituent element. Here, the upper valence band maximum (VBM) of the vanadium atom that is farthest from the substituent element is used as a reference in each cell. It is assumed that the vanadium atom that is farthest from the substituent element is in approximately the same environment as the vanadium atom in $VS_4$. In the calculation of the valence band maximum (VBM) and the conduction band minimum (CBM), DOS values that were equal to or less than 0.05 (states/eV/cell) were ignored.

In FIG. 8, the energy difference between the x marks corresponds to the band gap of the entire cell. Further, in FIG. 8, the energy difference between the + marks corresponds to the band gap of the substituent element itself. In some typical elements, noble gases, and alkali metals, the entire cell tends to have a smaller band gap, whereas the substituent element itself tends to have a larger band gap. In this case, the substituent element itself is considered to make little or no contribution to electronic conduction or inhibit electronic conduction. Further, 3d elements and 4d elements were generally similar, and it seems that the substituent element itself may act as a conduction path. On the other hand, since the d orbital of Cr or Mo as an added element is present right above the d orbital of original V, the relative Fermi level is increased by that degree. Since Cr and Mo both have one more electron in the outermost shell than V, the electron is considered to be localized in the added element.

FIG. 9 and FIG. 10 show that the distance between nearest-neighbor atoms changed to a parabolic shape according to the order of atoms in the periodic table. Noble gases and their peripheral elements move in an outward direction from the substitution site to an interstitial site. Elements around vanadium in the periodic table maintain their octahedral coordination. The 3d elements and 4d elements decrease in coordination number from Mn and Ru, and elements around Zn and Cd, which have d10 electronic configurations, are tetra-coordinated. The distance between nearest-neighbor atoms becomes minimal when the number of d-electrons is around 7 to 8. Further, the influence of the substituent element was limited almost exclusively to adjacent sites. Even when there was an influence, the influence was only to the extent that one sulfur atom deviates from the coordination plane.

The results in FIGS. 11 and 12 show that in the case of V substitution, the presence of Li atoms (points shown) is delocalized in the space, and the Li atoms were actively moving around. It was also found that Li atoms are present with high density and more stably between two $VS_4$ rather than three $VS_4$. Further, in the case of substitution with C, Al, and Ti, the presence of Li atoms in the space was found to be more localized than in the case of V substitution, and Li atoms were slow but relatively moving. In the case of substitution with Si, P, Fe, Zn, Tc, Ag, and Sn, the results show that Li atoms were strongly constrained near substitution sites. In the case of Si, P, Zn, Ag, and Sn substitution, the results show that the substituent elements moved in the interstitial direction and Li moved into the original V site.

The above results show that in the systems to which Li, B, N, O, F, Mg, S, Cl, Ca, Br, Sr, Sc, I, Fe, Co, Ni, Zn, Y, Mo, Tc, or Cd was added, the density of states appeared in the band gap. It was thus found that the addition of these foreign elements can enhance electronic conductivity and improve electrochemical performance.

Example 3: Preparation and Charge-and-Discharge Performance of Nb-Containing $VS_4$ Commercially available vanadium (III) sulfide ($V_2S_3$; produced by Kojundo Chemical Lab. Co., Ltd.) and sulfur (produced by Fujifilm Wako Pure Chemical Corporation) were weighed to achieve a molar ratio of 1:6 in a glove box (dew point: −80° C.) in an argon gas atmosphere and sealed in a glass tube in a vacuum. The vacuum-sealed sample was calcined in a tubular furnace at 400° C. for 5 hours. Excess sulfur was desulfurized by calcining the calcined sample in a vacuum at 200° C. for 8 hours to synthesize vanadium sulfide $VS_4$ (c-$VS_4$).

The resulting $VS_4$ was then weighed with commercially available niobium sulfide ($NbS_2$) at a molar ratio of 7:1 in a glove box with an argon gas atmosphere (dew point: −80° C.). These were placed in a pot and subjected to a mechanical milling process (ball diameter: 4 mm; number of revolutions: 270 rpm) for 40 hours by using a ball mill apparatus (PL-7, produced by Fritsch). A niobium-containing vanadium sulfide $VNb_{0.14}S_{4.29}$ was thereby synthesized and used as a cathode active material.

Test electrochemical cells (lithium secondary batteries) were produced using the obtained $VNb_{0.14}S_{4.29}$ as a cathode active material. Constant-current charge-discharge measurements were performed at 25° C. for 40 cycles at a charge-discharge rate of 0.1 C (1 C=1196 mAh/g) at a voltage within the range of 2.6 to 1.5 V with a pause time between cycles of 10 minutes.

With respect to the method for producing the test electrochemical cells, first, a working electrode (cathode) was produced by adding 5 mg of Ketjenblack and 1 mg of polytetrafluoroethylene (PTFE) as a binder to 10 mg of the $VNb_{0.14}S_{4.29}$ produced above and mixing these components in a mortar for 8 minutes and then attaching the resulting mixture to an aluminum mesh. Lithium metal was used as a counter-electrode (anode). Polypropylene was used as a separator.

Table 1 shows the results of charge-and-discharge cycle performance of Example 3 (discharge capacity retention (%) after cycles, with the discharge capacity at the initial) cycle being defined as 100). As is clear from Table 1, Example 3 (54% capacity retention after 40 cycles) exhibited a higher charge-discharge efficiency than Comparative Example 1, in which $VS_4$ not containing the foreign element was used (51% capacity retention after 40 cycles, as described in detail below).

Example 4: Production and Charge-and-Discharge Performance of Li- and Cl-Containing $VS_4$ LiCl-containing $VS_4$ ($VLi_{0.14}Cl_{0.14}S_4$) was prepared in the same manner as in Example 3 except that LiCl was added in place of $NbS_2$. Test electrochemical cells (lithium secondary batteries) were prepared in the same manner as described in Example 3 and subjected to a charge-discharge test. Constant-current charge-discharge measurements were performed at 25° C. at a charge-discharge rate of 0.05 C, 0.1 C, 0.3 C, 0.5 C, and 1 C (1 C=1196 mA/g) at a voltage within the range of 2.6 to 1.5 V.

Table 2 lists the discharge capacity (%) of Example 4 at each rate, relative to the discharge capacity at 0.05 C defined as 100%. As can be seen from Table 2, Example 4 exhibited a higher discharge capacity at each rate than Comparative Example 1, in which $VS_4$ not containing a foreign element was used, and Example 4 was found to be an electrode material with excellent rate performance (electrochemical performance).

Example 5: Production and Charge-and-Discharge Performance of Nb-, Li-, and Cl-Containing $VS_4$ $NbS_2$- and LiCl-containing $VS_4$ ($VNb_{0.17}Li_{0.17}Cl_{0.17}S_{4.33}$) was prepared in the same manner as in Example 3 except that $NbS_2$ and LiCl were added to achieve a $VS_4$:$NbS_2$:LiCl ratio of 6:1:1 in terms of molar ratio. For a charge-discharge test, test electrochemical cells (lithium secondary batteries) were prepared in the same manner as in Example 3 and subjected to constant-current charge-discharge measurement at 25° C. in the same manner as in Examples 3 and 4.

Table 1 lists the results of charge-and-discharge cycle characteristics of Example 5 (discharge capacity retention (%) after 40 cycles, with the discharge capacity at the first cycle being defined as 100). As can be seen from Table 1, Example 5 exhibited a higher capacity retention (56% capacity retention after 40 cycles) than Comparative Example 1, in which $VS_4$ not containing a foreign element was used (51% capacity retention after 40 cycles).

Table 2 lists the discharge capacity (%) of Example 5 at each rate, relative to the discharge capacity at 0.05 C defined as 100%. As can be understood from Table 2, Example 5 exhibited a higher discharge capacity at each rate than Comparative Example 1, in which $VS_4$ not containing a foreign element was used, and Example 5 was found to be an electrode material with excellent rate performance.

Comparative Example 1: Production and Charge- and Discharge Performance of $VS_4$ not Containing a Foreign Element $VS_4$ cells were produced in the same manner as in Example 5 except that $VS_4$ not containing a foreign element was used in place of $NbS_2$- and LiCl-containing $VS_4$. For a charge-discharge test, test electrochemical cells (lithium secondary batteries) were prepared in the same manner as in Example 5 and subjected to constant-current charge-discharge measurement at 25° C. in the same manner as in Examples 3 and 4.

Table 1 lists the results of charge-and-discharge cycle performance of Comparative Example 1. As can be understood from Table 1, Comparative Example 1 (51% capacity retention after 40 cycles) exhibited lower capacity retention (%) than Example 3 (54% capacity retention after 40 cycles) and Example 5 (56% capacity retention after 40 cycles), in which $VS_4$ containing a foreign element was used.

Table 2 lists the discharge capacity (%) of Comparative Example 1 at each rate, relative to the discharge capacity at 0.05 C defined as 100%. As can be understood from Table 2, Comparative Example 1 exhibited a lower discharge capacity at each rate than Examples 4 and 5, in which a foreign element-containing $VS_4$ was used, and Comparative Example 1 was found to be an electrode material having inferior rate characteristics.

TABLE 1

Retention (%) of discharge capacity after 40 cycles with a discharge capacity at the first cycle being defined as 100

| | Capacity retention (%) |
|---|---|
| Example 3 | 54 |
| Example 5 | 56 |
| Comparative Example 1 | 51 |

TABLE 2

| | Discharge capacity (%) at each rate relative to the discharge capacity at 0.05 C | | | |
|---|---|---|---|---|
| | Discharge capacity at 0.1 C relative to the discharge capacity at 0.05 C (%) | Discharge capacity at 0.3 C relative to the discharge capacity at 0.05 C (%) | Discharge capacity at 0.5 C relative to the discharge capacity at 0.05 C (%) | Discharge capacity at 1 C relative to the discharge capacity at 0.05 C (%) |
| Example 4 | 90 | 77 | 60 | 10 |
| Example 5 | 90 | 74 | 53 | 8 |
| Comparative Example 1 | 86 | 64 | 39 | 4 |

INDUSTRIAL APPLICABILITY

Nonaqueous secondary battery electrolyte solutions comprising the foreign element-containing vanadium sulfide of the present invention and nonaqueous secondary batteries comprising the nonaqueous secondary battery electrolyte solutions can be used for various known applications. Specific examples include laptop computers, cellular phones, electric vehicles, power sources for load leveling, and power sources for storing natural energy.

The invention claimed is:

1. A foreign element-containing vanadium sulfide comprising, as constituent elements, vanadium, sulfur, and an element other than vanadium and sulfur (foreign element M1), wherein the foreign element M1 includes at least one member selected from the group consisting of Nb, Ti, Zr, Sc, and Y;

the compositional ratio of the foreign element M1 to the vanadium (M1/V) is in the range of 0.05 to 1.5 in terms of molar ratio;

the compositional ratio of the sulfur to the vanadium (S/V) is in the range of 3.0 to 10.0 in terms of molar ratio; and the foreign element-containing vanadium sulfide has a $VS_4$ crystal structure.

2. An active electrode material for a lithium ion secondary battery comprising the foreign element-containing vanadium sulfide of claim 1.

3. An electrode for a lithium ion secondary battery comprising the active electrode material for a lithium ion secondary battery of claim 2.

4. A lithium ion secondary battery comprising the electrode for a lithium ion secondary battery of claim 3.

5. A foreign element-containing vanadium sulfide comprising, as constituent elements, vanadium, sulfur, and an element other than vanadium and sulfur (foreign element M2), wherein the foreign element M2 includes at least one member selected from the group consisting of Li, B, N, O, F, Mg, S, CI, Ca, Br, Sr, Sc, I, Zn, Y, Tc, and Cd;

the compositional ratio of the foreign element M2 to the vanadium (M2/V) is in the range of 0.05 to 1.5 in terms of molar ratio; and the compositional ratio of the sulfur to the vanadium (S/V) is in the range of 3.0 to 10.0 in terms of molar ratio.

6. The foreign element-containing vanadium sulfide according to claim 5, which has a $VS_4$ crystal structure.

7. An active electrode material for a lithium ion secondary battery comprising the foreign element-containing vanadium sulfide of claim 5.

8. An electrode for a lithium ion secondary battery comprising the active electrode material for a lithium ion secondary battery of claim 7.

9. A lithium ion secondary battery comprising the electrode for a lithium ion secondary battery of claim 8.

10. A foreign element-containing vanadium sulfide, which has a composition represented by formula (1):

$$V(M1_xM2_{(1-x)})_yS_z \tag{1}$$

wherein x represents more than 0 and less than 1, y represents 0.05 to 1.5, z represents 3.0 to 10.0, M1 represents at least one member selected from the group consisting of Nb, Ti, Zr, Mo, Sc, and Y, M2 represents at least one member selected from the group consisting of Li, B, N, O, F, Mg, S, Cl, Ca, Br, Sr, Sc, I, Fe, Co, Ni, Zn, Y, Mo, Tc, and Cd, and M1 and M2 are different.

11. The foreign element-containing vanadium sulfide according to claim 10, which has a $VS_4$ crystal structure.

* * * * *